(12) United States Patent
Roulin et al.

(10) Patent No.: US 8,563,058 B2
(45) Date of Patent: Oct. 22, 2013

(54) CAPSULE WITH FILTER FOR PREPARING A LIQUID NUTRITIONAL OR FOOD COMPOSITION AND RELATED BEVERAGE PRODUCTION SYSTEM

(75) Inventors: Anne Roulin, Yverdon-les-Bains (CH); Yann Epars, Penthalaz (CH); Sophie Abraham, Malbuisson (FR); Frédéric Doleac, Penthalaz (CH); Vincent Martin, Crissier (CH); Heinz Wyss, Oberdiessbach (CH); HansPeter Pleisch, Corseaux (CH); Nicolas Bezet, Macon (FR); Bruno Bizet, Montbellet (FR); Nihan Dogan, La Croix-sur-Lutry (CH)

(73) Assignee: Nestec S.A., Vevey (CH)

( * ) Notice: Subject to any disclaimer, the term of this patent is extended or adjusted under 35 U.S.C. 154(b) by 93 days.

(21) Appl. No.: 13/258,956

(22) PCT Filed: Mar. 19, 2010

(86) PCT No.: PCT/EP2010/053652
§ 371 (c)(1),
(2), (4) Date: Sep. 22, 2011

(87) PCT Pub. No.: WO2010/112353
PCT Pub. Date: Oct. 7, 2010

(65) Prior Publication Data
US 2012/0015080 A1 Jan. 19, 2012

(30) Foreign Application Priority Data
Mar. 31, 2009 (EP) .................................... 09156782

(51) Int. Cl.
*B65D 81/32* (2006.01)
(52) U.S. Cl.
USPC .................. 426/115; 426/77; 426/78; 99/295

(58) Field of Classification Search
USPC ......... 426/77, 78, 79, 80, 81, 82, 83, 84, 106, 426/115; 99/295
See application file for complete search history.

(56) References Cited

U.S. PATENT DOCUMENTS

| 2009/0047389 A1 | 2/2009 | Jarisch et al. .................... 426/80 |
| 2010/0021604 A1 | 1/2010 | Roulin et al. .................. 426/506 |
| 2011/0005399 A1 | 1/2011 | Epars et al. .................... 99/295 |

FOREIGN PATENT DOCUMENTS

| EP | 1 440 640 A2 | 7/2004 |
| EP | 1 826 148 A1 | 8/2007 |
| WO | WO 2006/077259 A1 | 7/2006 |
| WO | WO 2008/012314 A1 | 1/2008 |
| WO | WO 2008/132571 A1 | 11/2008 |
| WO | WO 2009/092629 A1 | 7/2009 |

OTHER PUBLICATIONS

International Search Report, PCT/EP2010/053652, mailed Jun. 7, 2010.

*Primary Examiner* — Rena Dye
*Assistant Examiner* — Chaim Smith
(74) *Attorney, Agent, or Firm* — Winston & Strawn LLP (57) ABSTRACT

A capsule for use in a beverage production device, the capsule containing ingredients to produce a nutritional or food liquid when a liquid is fed into the capsule at an inlet face thereof, with the capsule being provided with a filter having a plurality of filtering orifices and a flow collection member placed downstream of the filter to collect the filtered liquid from the filtering orifices. The collection member includes at least one restriction orifice to focus the flow of liquid in at least one jet of liquid at high velocity in the compartment containing the ingredients. The invention is particularly advantageous for producing a nutritional liquid (e.g., infant formula) or a food from powdered ingredients.

19 Claims, 8 Drawing Sheets

CAPSULE WITH FILTER FOR PREPARING A LIQUID NUTRITIONAL OR FOOD COMPOSITION AND RELATED BEVERAGE PRODUCTION SYSTEM

This application is a 371 filing of International Patent Application PCT/EP2010/053652 filed Mar. 19, 2010.

BACKGROUND

The present invention relates to a capsule for the preparation of a nutritional liquid or food compositions in a beverage preparation device.

Nutritional compositions can be, for instance, infant formulas or also nutritional liquids for toddlers, invalids, elderly people, persons having nutritional deficiencies or athletes. Food compositions can be dairy-based liquids, soup, coffee or tea beverages. These compositions are prepared from ingredients contained in a capsule by addition of a liquid such as hot or ambient water. The liquid may contain contaminants such as micro-organisms or solid particles. These contaminants should be removed from the liquid before the liquid is mixed with the ingredients.

In particular, infant formulas have been developed as a substitute for human breast milk in order to provide required nutrients to infants. In general the infant formulas are either based on cow or soy milk and may be provided in different forms such as powder or concentrated liquid.

Each of the different forms in which infant formulas may be provided has their own advantages. For instance, although the infant formula provided in a powder has a relative high nutritional quality, the preparation thereof is time consuming, since the water used for reconstitution must be boiled in advanced and allowed to cool then poured into a sterilised drinking vessel containing the powder in order to prepare a ready-to-feed liquid infant formula.

If prepared and consumed in this manner, powdered infant formulas provide a safe and nutritionally good substitute for mother's milk in the situations described above. However, the process needs to be repeated every time a feed is required. It may readily be seen that this may not always be convenient and, as a consequence, many parents and other caregivers do not prepare the formulas properly and hence expose the infant to the risk of infection. Alternatively, batches of the infant formula may be prepared and then stored until needed. Unfortunately, if any pathogen has contaminated the formula, it may have time to replicate in certain storage conditions.

In further development, infant formulas in ready-to-feed single serve portions have been introduced which overcome the inconvenience of the preparation of the infant formula. However, these ready-to-feed products are more costly than infant formulas stored in bulk and there is the same need to consume the formula immediately after opening to avoid the risk of contamination with bacteria.

The immune defences of infants and young children are generally not fully developed and, as a result, these populations are particularly vulnerable to both bacterial and viral infections. For example, they may be prone to infections in circumstances where the immune system of a healthy adult would resist infection or they may suffer more serious consequences as a result of infection than would a healthy adult. Similar difficulties may arise in populations where the immune system is compromised such as the elderly. The consequence of this is that devices that prepare nutritional compositions which are perfectly safe for healthy adults may not be able to produce products which meet the increased safety standards required for products to be consumed by subjects having immature or compromised immune systems.

More generally, the liquid (e.g. water) used for the preparation of the nutritional liquid or food can contain particles which may be allergens or may be undesired for many other different reasons.

Therefore, there is a need for a method or an apparatus which enables provision of nutritional composition for instance an infant formula or other food compositions in a convenient and safe manner.

WO2006/077259 discloses a method for preparing a single serving of a nutritional composition comprising introducing liquid such as water into a cartridge containing a unit dose of the composition in concentrated form. Thereby, the water is treated prior to the introduction into the cartridge in order to remove pathogens from the water. This treatment may be for instance a pre-heating, a filtering or an irradiation of the water with ultra-violet light.

A device which teaches the principle of treating water by means of a filter used for the preparation of nutritional compositions in a dispenser from capsules is disclosed in co-pending European patent application No. 06117801.8 filed 25 Jul. 2006 entitled "Dispenser for preparing a nutritional composition".

A capsule with an integrated antimicrobial filter has been described in co-pending European patent application No. 08100900.3 filed 24 Jan. 2008.

In particular, it desirable to ensure that the filter is strategically placed in the capsule to avoid any risk of clogging by the nutritional/food solids contained in the capsule and also to ensure a complete delivery of the nutritional product from the capsule. It is also desirable to ensure a full dissolution/dispersion and proper mixing of the ingredients with the liquid fed in the capsule to ensure the full nutritional delivery from the capsule. A proper interaction can be obtained if there is also sufficient velocity of the liquid entering the ingredient's compartment. When the filter is placed upstream of the compartment, the risk of clogging with components such as fat and/or proteins is avoided but the liquid velocity is significantly reduced after it has passed the filter when it interacts with the ingredients. The dissolution/dispersion of the ingredients and mixing in the liquid can therefore be insufficient. As a result, there is a risk that the capsule is not correctly emptied but a significant amount of solids residue is left in the capsule, thereby not ensuring the desired nutritional content in the delivered mixture.

The present invention aims at solving the aforementioned problem as well as others which will be developed in the present specification.

SUMMARY OF THE INVENTION

The present invention relates to a capsule for use in a beverage production device, the capsule comprising a compartment containing ingredients to produce a nutritional or food liquid when a liquid is fed into the capsule at an inlet face thereof, the capsule being provided upstream of the compartment with a filter having a plurality of filtering orifices, wherein it further comprises a flow collection member placed downstream of the filter and upstream of the compartment to collect the filtered liquid from the filter; wherein said collection member comprises at least one restriction orifice to focus the flow of liquid in at least one jet of liquid at high velocity inside the compartment containing the ingredients.

Preferably, the flow collection member has a considerably fewer number of orifices than the filter in order to focus the flow of liquid exiting the filter so that the liquid, which has been slowed down after it has passed through the filter, can be given an increased velocity when entering in the compartment. By "considerably fewer" it is meant that the number of restriction orifices is at least 10 times less than the number of filtering orifices.

The restriction orifice/orifices of the collection member is/are designed in the collection member to produce a jet of liquid at high velocity. For this, the restriction orifice(s) has (have) a longer transversal dimension (i.e., for a non-circular section such as an elongated slot) or a diameter (i.e., for a circular section) between 0.4 to 1.5 mm. The orifice(s) has (have) also preferably an axial dimension, i.e., length between 1 and 3 mm, most preferably between 2 mm. A too short length provides a diffused or spray-type jet of liquid which is detrimental to the dissolution/dispersion of the ingredients in the capsule.

The restriction is also preferably of relatively constant section. An varying cross section, e.g., tapered section, causes also a spray jet pattern as opposed to a focused jet.

The flow velocity through the orifice of the collection member is preferably comprised between 1 and 20 m/sec.

The number of restriction orifices is also reduced to maintain the velocity high in the ingredients' chamber. The number of restriction orifices should be less than 20. Preferably the number of restriction orifices ranges from 1 to 5 depending on different factors such as the liquid energy required for the dissolution of the ingredients, the powdered composition, the type of pump, etc. For example, with a stronger pump, four orifices can still provide an efficient liquid jet entering the chamber. Therefore, the flow of liquid exiting the filter recovers a higher velocity than after its passage through the filter, by being focused through the flow collection member in at least one jet of liquid. As a result, a better dissolution and a more intimate mixing between the liquid and the ingredients is carried out in the chamber of the capsule.

The restriction orifice(s) can have a circular cross-section so that the section of the resulting jet is substantially circular as well.

In another alternative, the restriction orifice comprises at least one elongated slot. As a result, a thin layer of liquid with high momentum is provided which is able to cover, by direct impact, a larger volume of ingredients in the chamber.

The restriction orifice(s) can be oriented towards the chamber in a direction substantially normal to the transversal plane of the capsule, i.e., typically, normal to the plane of the collection member.

In an alternative, the restriction orifice(s) can be oriented with an inclination angle relative to said transversal plane. The inclination angle is lower than 35 degree, most preferably lower than 20 degrees, most preferably comprised between 5 and 20 degrees. The orientation of the orifice is taken by measuring the angle between the axial line of the orifice and the transversal plane of the capsule at the collection member.

The restriction orifice can also be placed off-centred from the central axis of the capsule. The benefit is that the produced jet increases the swirling action of the liquid in the chamber around the central axis.

The restriction orifices can also be oriented to direct the jet in a direction passing away from the central axis of the capsule. Again, this configuration of the jet provides an enhanced swirling action of the liquid in the chamber and may improve the dissolution of the ingredients.

In a possible mode, a flow collecting chamber is present between the filter and the flow collection member. The flow collecting chamber may be of a relatively low volume such as between about 5 to 100 mm$^3$.

Preferably, support members are placed downstream of the filter to prevent or at least reduce the deformation in flexure of the filter under the pressure of liquid exerting upstream of the filter and which could block the flow of liquid towards the orifice(s). Furthermore, the support member prevents the filter from rupturing under pressure to maintain the integrity and efficiency of the filter during operation in the beverage production device.

The flow collection chamber is so defined between the support members enabling the liquid to be collected and gathered towards the orifices. The flow collection chamber may be divided into several compartments; each one being allocated to a particular region of the support member for collecting and dividing liquid it into several streams via at least one orifice provided in each compartment. However, preferably, only one compartment is provided for collecting liquid to the one or more orifices.

In a particular aspect, the support members are integrally formed as projections protruding from the flow collection member. For example, the flow collection member can be formed in one piece of plastic with a plurality of projections for supporting the filter. The projections can take different forms such as studs, ridges, a grid, etc. The projections are preferably evenly distributed over the whole cross section of the filter and they are in a number sufficient to reduce a too high flexure of the filter which could block or slow the flow down in the collecting chamber and/or orifices and/or cause damage of the filter.

In a preferred aspect, the filter is an antimicrobial filter. However, the invention is not necessarily limited to such type of filter as it could also be a simple particle filter.

By "antimicrobial filter", it is meant a filter which is effective to reduce the presence of, preferably to eliminate, certain micro-organisms, such as bacteria from the filtered liquid (i.e., the liquid passing the filter). Depending on its characteristics, such as its pore size, the filter may also be effective for reducing or eliminating viruses or other micro-organisms such as moulds or yeast and other solid organic or mineral particles (e.g., metals).

The filter may comprise at least one polymeric microporous membrane or three-dimensional filter. The material for the membrane can be chosen from the list consisting of PES (polyethersulphone), cellulose acetate, cellulose nitrate, polyamide and combinations thereof. The material for the three-dimensional filter may be ceramic, a sintered material such as metal or plastic or hollow fibres.

For antimicrobial purpose, the filter has preferably a pore size of less than 0.2 microns. It may have a thickness of less than 500 microns, preferably less than 300 microns. More than one membrane can be used in series with same or different pore sizes and/or thicknesses.

In a mode, the antimicrobial filter comprises a tear-resistant permeable member placed upstream of the microporous membrane. By "permeable", it is meant here the permeability to the liquids. The member can be placed adjacent to the filter or at a short distance. The tear-resistant permeable member is designed to maintain the integrity of the filter membrane against mechanical stresses such as tearing, scratching, piercing (e.g., during manipulation or storage) or the pressure of the liquid injected at the inlet face. It should be noted that, in some cases, the tear-resistant permeable member forms the inlet face of the capsule itself. In other modes, a peelable membrane or a lid are provided above the tear-resistant member. The tear-resistant permeable member can be a cover lid, a non woven or grid and combinations thereof. It can be made of various materials having relatively high tensile strength compared to the microporous membrane. Preferred materials are non woven materials. In particular, the tear-resistant member can be a mono- or multi-layer formed of polyolefins such as PP, PE and combinations thereof such as PP/PE/PP (polypropylene/polyethylene/polypropylene).

The tear-resistant member is preferably designed to be sealed onto the microporous filter membrane, e.g., PES membrane. Sealing of the tear-resistant member and membrane can be performed by lamination, co-extrusion, welding or any other suitable sealing process. The sealing preferably occurs along the whole plain surface of the membrane but alternatively, sealing may be performed in local areas of the filter membrane. The advantage is that the resulting multi-layer including the tear-resistant member and filter membrane, can be easy to handle and to assemble with the rest of the capsule. The risk of damaging the filter membrane during production is so greatly reduced.

In an alternative, the filter may be formed of a filtering solid piece such as a sintered block of polymer, metal and/or ceramic. By "solid piece", it is means a three-dimensional element having filtering capacity.

The at least one compartment of the capsule containing the ingredients is further demarcated by a cup-like shaped body and a bottom delivery system. Preferably, the body comprises a liquid delivery duct for improving a clean delivery by directing the flow of the nutritional liquid to a receptacle (e.g., baby bottle, cup, glass, etc.) without significant contact with the beverage production device. The cup-like shaped body can be formed of one or more pieces of plastic or aluminium.

The bottom delivery system can be:
- a perforable membrane against perforating members and/or,
- a membrane that breaks under pressure and/or,
- a valve comprising at least one hole or slit opening under pressure and/or,
- a filtering wall with premade orifices for separating the delivered liquid from the solids still in the compartment.

When the delivery system is a membrane that breaks under pressure, the membrane can comprise a preweakened or scored portion that rupture under pressure.

The valve can, for instance, be a silicone valve with a specific cracking pressure.

It should be noted that the body can be preferably made of a relatively rigid material or, alternatively, a flexible material such as a permeable filter membrane, e.g., a textile wall.

In a preferred mode, the delivery system is a perforable membrane closing the compartment and the perforating members are placed between the bottom of the cup-like shaped body and the delivery membrane. In particular, the compartment opens for allowing the nutritional liquid to leave the capsule when a pressure is reached in the compartment which causes the membrane to perforate against the perforating members. As a result, the nutritional liquid can pass through the orifices created in the membrane by the perforating members. It should noted that the terms "perforable" or "perforating" refer to a broad meaning which encompass piercing, tearing, dissolving, melting or breaking of the membrane.

Preferably, support members can be placed between the perforating members and the liquid delivery duct. The support members provide the advantage that the delivery membrane is pierced only at strategic locations but is supported at others in order to create a defined flow path toward the flow outlet duct of the capsule. In particular, support members are provided in the vicinity of the outlet duct to prevent the duct from becoming blocked by the collapsing membrane. Further aspects of this configuration can be found in co-pending European patent application No. 08152871.3 entitled "Cartridge for preparation of a liquid comprising puncturable delivery wall."

In a possible mode, the inlet face comprises a pierceable membrane or a lid comprising a liquid inlet (e.g., inlet duct).

Furthermore, the filter may be sealed onto the flow collection member together with the tear-resistant member to form an assembly which can be easily manipulated during production of the capsule. Such a sealed assembly can be connected, e.g., heat or ultrasonically sealed to the rest of the capsule, e.g., the body of the capsule, after the filling the body of the capsule with the ingredients. This results in a closed capsule which may be further packed in a gas-tight container or be covered individually by gas-tight films or a membrane cover.

The dissolution of the ingredients in the capsule could be also obtained by inserting a magnetic stirrer, i.e., a magnet or ferro-magnetic element, in the capsule that is driven in rotating during the preparation of the nutritional liquid. The uses of baffles in the compartment would also increase the turbulence and would assist in the dissolution of the powdered ingredients.

The capsule of the invention can be further marked with a code such as a bar code, an RFID tag or a digital mark to allow identification of the capsule in the beverage production device as described in European co-pending patent application No. 08159947.4 entitled: "Portion-controlled nutrition system and method using capsules".

The invention further relates to a beverage production system comprising a capsule as aforementioned and a beverage production device wherein the device comprises an injection nozzle complementary fitting on the inlet face of the capsule in a liquid-tight manner to allow injection of a liquid through the filter placed upstream of the compartment.

BRIEF DESCRIPTION OF THE DRAWINGS

Further features, advantages and objects of the present invention will become apparent in the following drawings and detailed descriptions of preferred embodiments of the invention, wherein.

DETAILED DESCRIPTION OF THE INVENTION

In all the following examples, the "filter" can be an antimicrobial filter or alternatively another type of filter such as a particle filter (with a larger pore size) for removing solid organic or mineral particles from the liquid.

Figure 1:
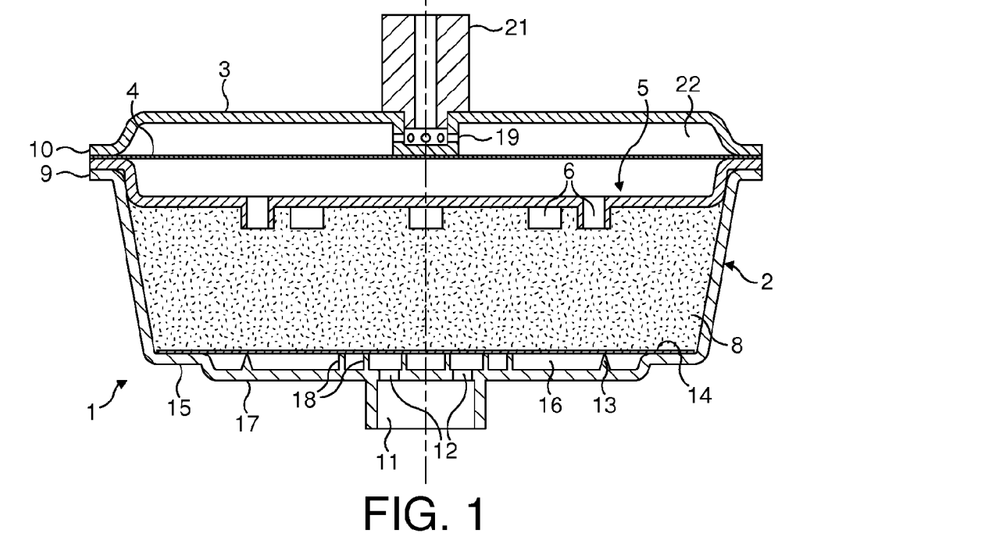
FIG. 1 represents a cross sectional view of a capsule in association with an injection part of the beverage production device according to a first embodiment of the present invention.
Figure 2:
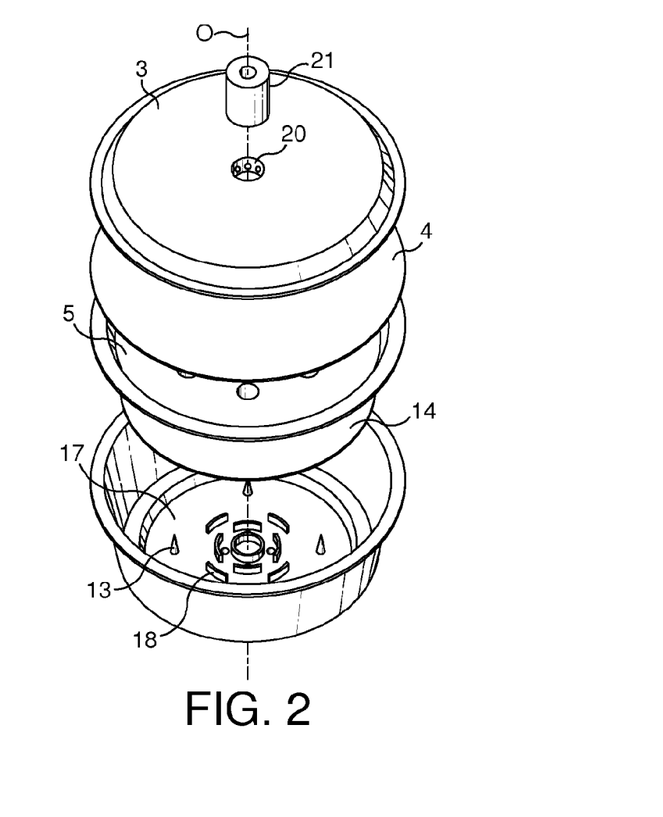
FIG. 2 is an exploded view of the capsule of FIG. 1.

The capsule 1 according to the first embodiment of FIGS. 1 and 2 comprises a cup-shaped-like body 2 which is covered by an external lid 3. Inside the capsule, a filter 4 is provided which extends across the entire section of the capsule when viewed in the transversal direction of the liquid flow traversing the capsule. Downstream of the filter, is provided a flow collection member 5 which also extends across the whole surface of the capsule. The flow collection member 5 has a series of orifices 6 of relatively small size for allowing the flow communication between a collecting chamber 7 between the filter and the lid, and a main chamber or compartment 8 containing the nutritional ingredients.

The cup-like shaped body comprises an upper rim 9 onto which can be sealed, e.g., by ultrasonic welding, the edge of the collection member 5, the filter and the rim 10 of the upper lid. At its bottom, the body has a beverage outlet duct 11 for discharge of the produced nutritional or food liquid. The duct may comprise several outlets 12 to divide the flow into different flow streams in the duct and consequently slow down the beverage flow. Perforating members 13 are provided in the bottom of the body to allow the opening of a perforable delivery membrane 14. The membrane can be welded on the inner stepped edge 15 of the body. Therefore, a secondary chamber 16 is formed between the raised membrane and the bottom 17 of the body to collect the liquid that passes through the orifices of the pierced membrane and to direct the liquid towards the outlets 12 of the discharge duct. Furthermore, support members 18 are provided which project from the bottom to support the delivery membrane and, in particular, avoid the membrane to collapse in the vicinity of the outlets 12. The body 2 can be a rigid moulded plastic piece obtained by injection moulding or thermoforming. It may also be a flexible element obtained by plastic blow moulding or be a flexible sheet of textile, for instance. In case of a sheet of textile, the delivery system can be a permeable portion of the sheet.

For infant formula, it is undesirable to have a foam layer on top of the liquid. It has been found that substantially no foam is created in the dispensed liquid when the liquid is mixed at low pressure in the chamber 8. The low pressure can be obtained by perforating the lower membrane 14 rapidly after the liquid has filled the compartment of the capsule, such as by providing an easily perforable membrane and/or more acute perforating members or alternatively, a flow release valve of the delivery system that opens at a relatively low pressure.

In this first embodiment, the capsule has perforated inlets 19 for the injection of a diluting liquid, e.g., heated or ambient water, with the ingredients. The inlets can be provided in the upper lid 3 of the capsule, for instance, in a recess 20. The recess can so form a positioning seat for receiving an injection nozzle 21 (foreign to the capsule) of the beverage preparation device. The outlets 19 can form a series of radial orifices for injecting liquid in a diverging pattern in a collection chamber 22 above the filter.

Figure 3:
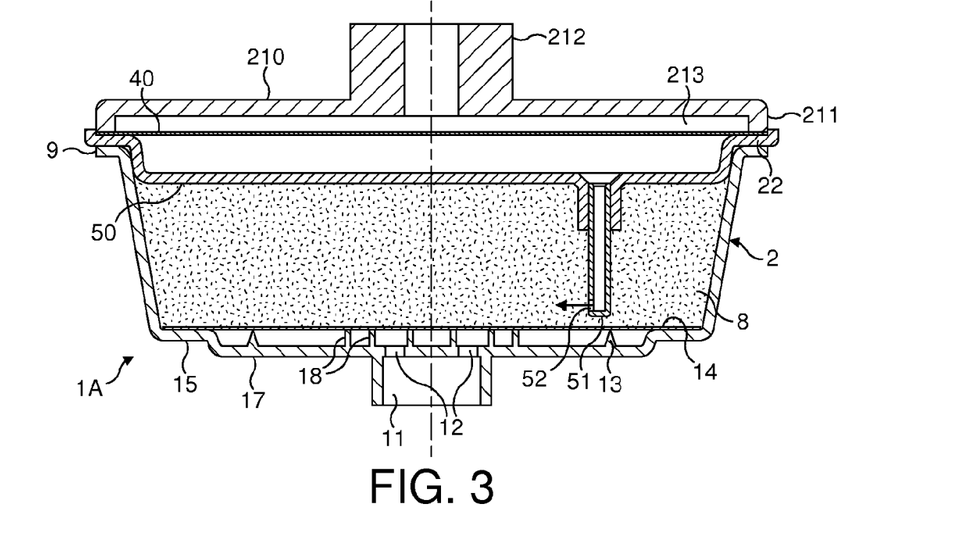
FIG. 3 is a cross sectional view of a capsule according to a second embodiment.
Figure 4:
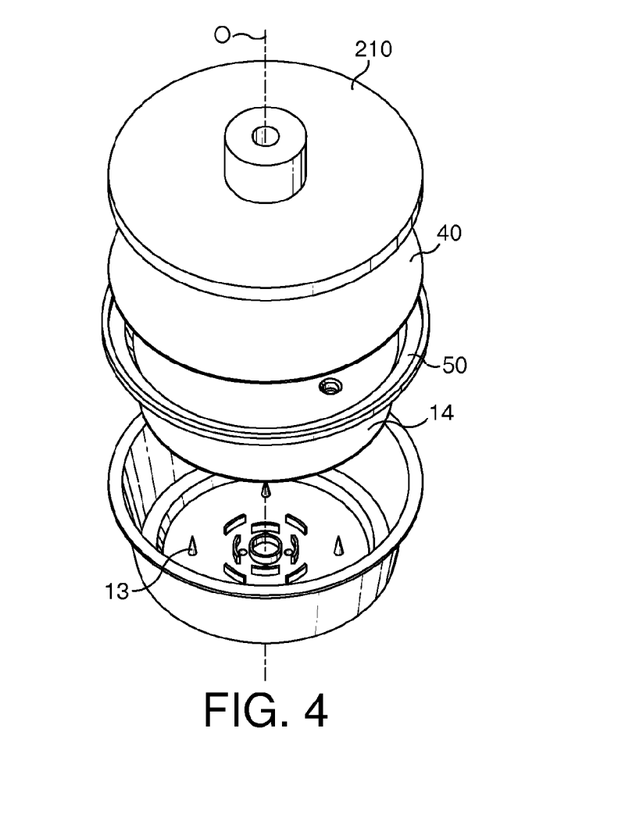
FIG. 4 is an exploded view of the capsule of FIG. 3.

A second possible embodiment is illustrated in FIGS. 3 and 4. In this embodiment, the capsule 1A comprises a flow collection member 50 which has a jet-making nozzle 51. The nozzle extends from the flow collection member by, for instance, a tubular element comprising a small outlet 52 directed inwards the compartment 8 containing the ingredients. The size of the orifice can be chosen to provide a liquid jet at high velocity. The velocity of each jet of liquid created by passing through each orifice may be, for instance, of from 0.1 to 5 m/sec. For instance, the orifices has a diameter of less than 2.0 mm, most preferably comprised between 0.4 and 1.5 mm.

The lid of the capsule can also be omitted. Therefore, the top part of the capsule is formed by the filter 40. The capsule can be protected before insertion in the beverage preparation device by an overwrapping package, e.g., a gas barrier overwrapping film or a protective layer locally covering the filter. A liquid injection part 210 of the beverage production device can be formed of an injection plate large enough to seal on the upper edge of the capsule, more particularly, onto the edge of the filter 40 and/or flow collection member 50. For this, the part 210 has edges 211 matching the edges 22 of the collection member. A sealing means such as a rubber ring can be provided to the part 210 for ensuring a fluid-tight engagement. The centre of the liquid injection part 210 comprises a liquid inlet duct 212 and the part has a recess 213 for collecting the liquid above the filter.

Therefore, the liquid injected by the liquid injection part is passed through the filter for removing the contaminants present in the liquid such as micro-organisms and possible solid particles. The flow of liquid is re-focused by the flow collection member through a jet-making nozzle 51 protruding from the collection member inside the chamber 8. The liquid is so given a high velocity when entering the compartment 8 for providing high turbulence with the ingredients. When a sufficient pressure of the liquid/mixture builds up in the compartment, the delivery membrane 14 flexes and perforates against the perforating members 13. The mixture of liquid and nutritional ingredients can so pass through the orifices created by the perforating members 13 and travels transversally towards the duct 11 for being discharged in a receptacle placed underneath. The support members 18 can form a labyrinth-like structure for slowing down the nutritional liquid flowing in a transversal direction below the membrane 14, before the liquid is discharged. Such structure enables to slow down the flow of liquid and avoids splashing of liquid outside the capsule. A capsule having such a liquid delivery structure is described in European co-pending patent application No. 08152871.3 entitled: "Cartridge for preparation of a liquid comprising puncturable delivery wall". In this embodiment, the jet-forming nozzle is provided with an injection port which is directed in a transversal direction. This direction may be substantially parallel to the plane of the collection member 50 (i.e., also normal to the central axis O of the capsule). It should be noted that the injection port could be directed in many other directions such in an axial direction (i.e. parallel or aligned relative to axis O) as in the embodiment of FIGS. 1 and 2 or in an inclined direction. The jet-forming nozzle could also have two or more injection ports oriented in different directions.

Figure 5:
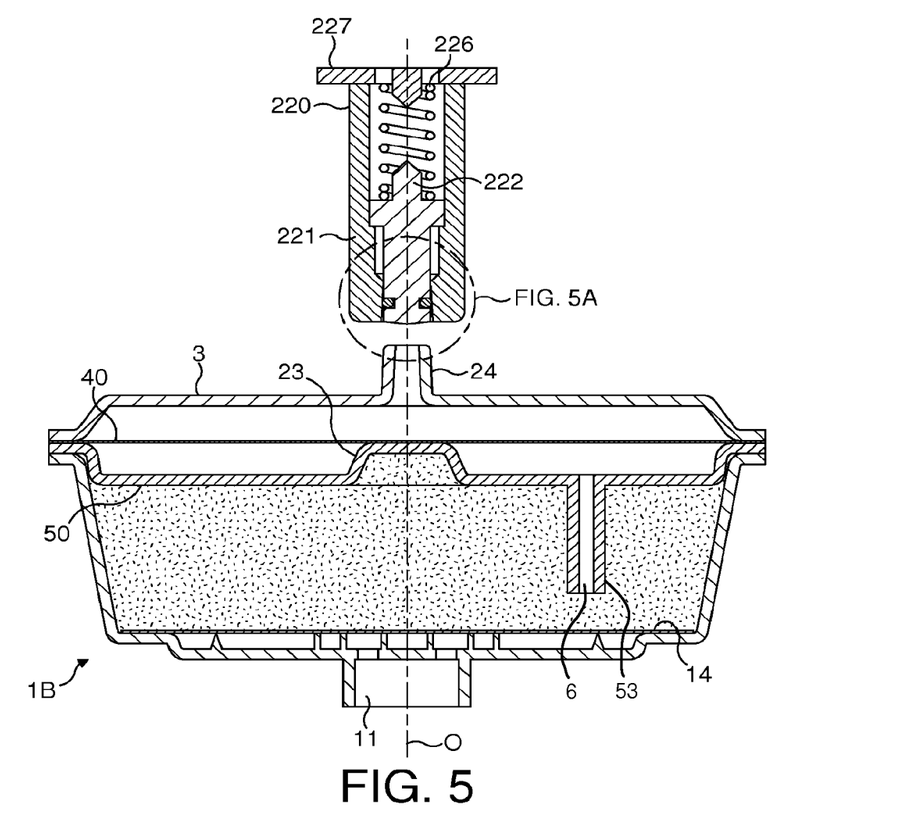
FIG. 5 represents a system with a capsule of the invention and a liquid injection part of the beverage production device before coupling.
Figure 6:
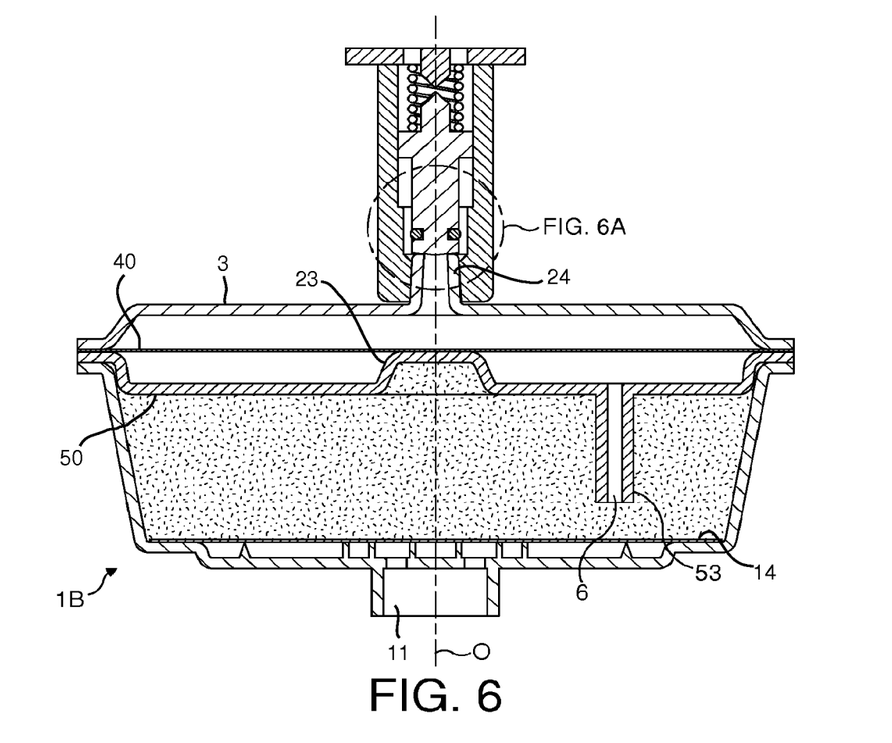
FIG. 6 is a system of FIG. 5 after coupling and during injection.

In a third embodiment illustrated in FIGS. 5 to 6, the capsule 1B has a flow collection member 50 comprising a support means 23 for supporting the filter 40 when submitted to the pressure of injected liquid. The support means 23 can be at least one protrusion made integrally from the flow collection member itself, as shown, or it could be a separate element. The lid 3 of the capsule, in this embodiment, may comprise a liquid inlet duct 24 protruding outwardly, e.g., along a centreline of the capsule. The duct 24 can be so associated to a liquid injection device 220 of the beverage production device comprising a tubular fitting 221 which adjusts in fluid-tight engagement around the duct 24.

Figure 5A:
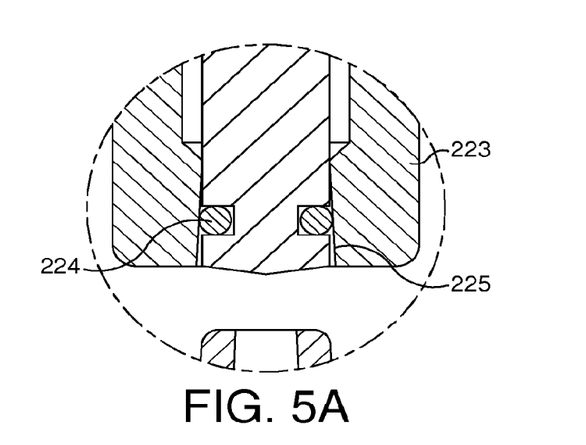
FIG. 5A is a detail view of the liquid injection part of FIG. 5.
Figure 6A:
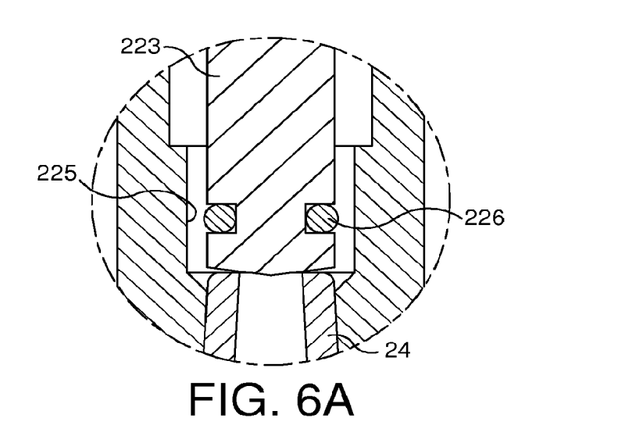
FIG. 6A is a detail view of the liquid injection part of FIG. 6.

The liquid injection device as illustrated in the embodiment of FIGS. 5 and 6 further comprises a check valve 222 which opens as a result of the engagement of the fitting 221 with the duct 24. As shown in FIG. 5A, before engagement, the valve has a piston 223 with a sealing member 224 blocking the liquid passage 225 of the liquid injection device. A spring-biasing means 226 connected to a support 227 is further connected to the piston 223 to force the piston in closure of the passage. When the fitting 221 is engaged to the duct 24 of the capsule, as shown in FIG. 6A, the duct 24 enters the passage 225 and pushes the piston 223 internally forcing the spring-biasing means 226 to compress. The piston is thus pushed in a larger passage 226 enabling liquid to enter into the duct 24. The end of the piston is further shaped, e.g., with a cone or recesses, to allow liquid to pass between the surface of the piston and the surface of the duct.

In this embodiment, for example, the flow collection member can have a single tubular orifice 6 formed as a straight tubular extension 53 of the member directed downwards. The orifice 6 can thus extend in a direction substantially perpendicular to the transversal plane of the collection member. The orifice 6 can also be provided only in the thickness of the transversal wall of the collecting member 500 without protruding downwardly in the chamber, i.e., without making a projection 53. In another alternative, the orifice can be slightly inclined relative to the plane such as in a direction passing away from the central axis O. These two configurations allow a swirling movement to take place in the capsule which improves the dissolution and/or dispersion of the powdered ingredients.

Figure 7:
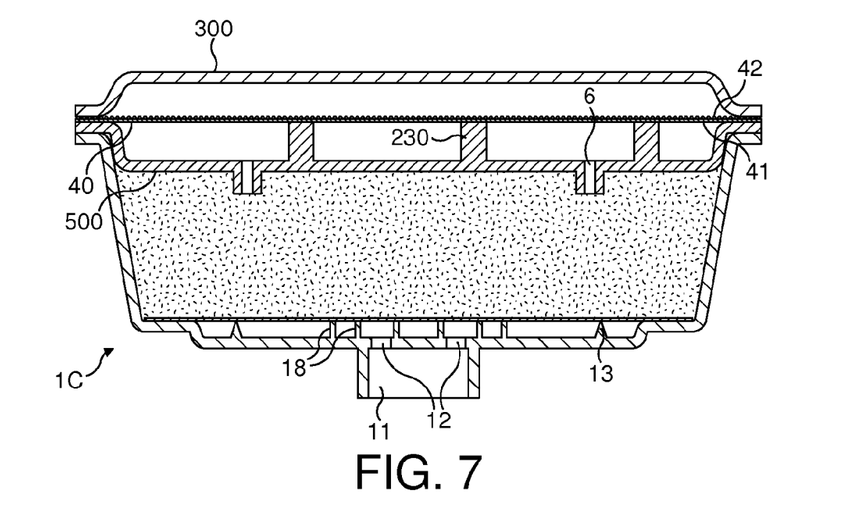
FIG. 7 is a cross sectional view of a capsule according to a third embodiment.

FIG. 7 illustrates a further embodiment of the capsule 1C of the invention into which the flow collection member 500 has a plurality of support projections 230 for supporting the filter 40. The projections can be formed integrally in the member 500 and be distributed evenly to provide an efficient support for the filter. It should be noted that a certain flexure of the filter can be admitted but not to the extent that it could damage the filter causing the risk of liquid to bypass the filter pores. The projections may form a network of protruding ridges forming a criss cross pattern for example.

The filter can advantageously be formed of at least one microporous membrane 41 and a tear-resistant member 42 placed upstream of the membrane. The tear-resistant member 42 can be sealed onto the membrane 41 so to form a multi-layer that can be easily handled during production of the capsule. The filter membrane is preferably a membrane made of polyethersulfone or any suitable microporous polymer adapted to retain micro-organisms while allowing liquid to traverse it when the liquid is given a pressure of injection at the inlet face of the capsule, e.g., between 1 to 8 bar, preferably between 4 and 7 bars. The pressure varies during injection, dissolution, opening and dispensing of the liquid through the capsule. The higher pressure, e.g., 6-7 bars, is typically reached just before the opening of the delivery system of the capsule, i.e., the lower membrane. Then, the pressure drops to a pressure typically between 2 to 4.5 bars. The pressure loss through the collecting member depends on the diameter of the orifice. Typically, it is measured between 2 and 5 bars. In order for the membrane to resist the pressure of liquid and avoid it to tear apart, the membrane is protected by an upstream member 42 which is preferably a non woven material. The tear-resistant member 42 is preferably a multi-layer such as PP/PE/PP which can be sealed to the microporous membrane. Of course, other material having high tensile strength could be used such as a fabric, a grid or a perforated plastic.

It should be noted that the filtering multi-layer 40 can be associated to the flow collection member 500 as a pre-assembled element, i.e., subassembly, for facilitating the handling and sealing during the manufacturing of the capsule. For instance, the filtering multi-layer 40 can be sealed, e.g., by ultrasonic welding to the flow collection member and, eventually, the resulting subassembly be so produced in a location remote from the place where the capsule is filled with the ingredients. After the body of the capsule has been filled with the ingredients, the subassembly (i.e., filtering multi-layer 40 and collection member 500) can be sealed onto the peripheral edges 9 of the body for closing the capsule.

The filtering multi-layer 40 can of course be used in all the embodiments of the present invention.

Figure 8:
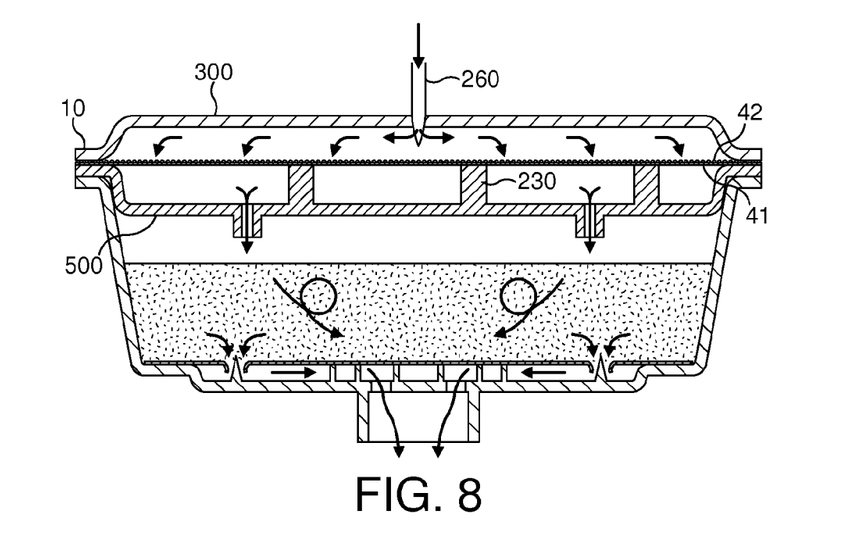
FIG. 8 is a cross sectional view after coupling and during injection with an injection part of the beverage production device.

The capsule of FIGS. 7 and 8 can further comprise a perforable lid 300. The lid can be formed of a rigid or a flexible material. The lid may be, for instance, a thermoformed or injected plastic lid. It may also be an aluminium, plastic and/or multilayer (e.g., plastic/metal) membrane. The lid and body of the capsule may include a gas barrier layer such as EVOH or metal to avoid oxidation of the ingredients contained in the capsule.

The capsule 1C is thus perforated by at least one injection needle 260 for the introduction of liquid in the capsule. The fluid-tight sealing engagement at the injection side of the capsule between the capsule and the device is not illustrated but it can be obtained by means known per se, such as by a seal placed around the needle(s) or by a seal at the edge 10 of the lid 300.

Figure 9:
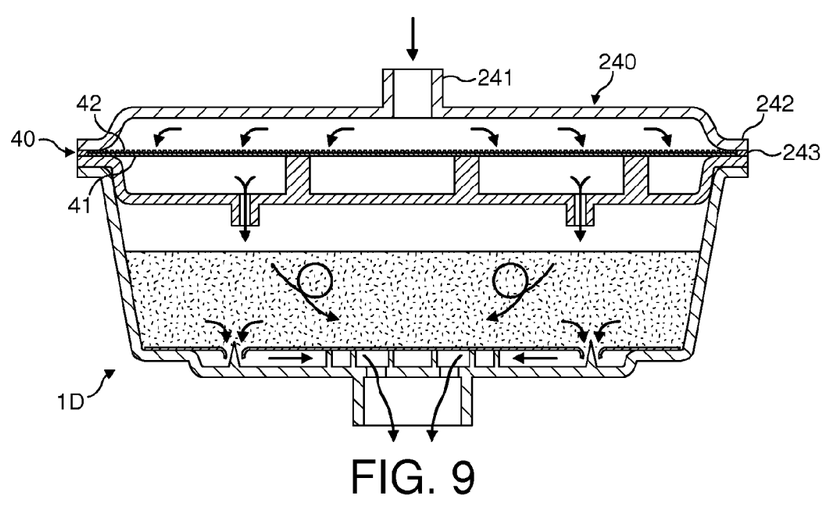
FIG. 9 is a cross sectional view of a system with a capsule according to a fourth embodiment and coupling with an liquid injection part of the beverage production device.

In the embodiment of FIG. 9, the capsule 1D is the same as the one of FIG. 7 except that the capsule has no cover lid. The capsule has the multi-layer antimicrobial filter 40 forming the inlet face of the capsule. In this case, it is important that the filter has a pressure and a tear-resistant member 42 such as a non woven placed adjacent (above) and preferably sealed to the membrane. Sealing of the filter 40 can be obtained by mechanical anchoring, such by having the material of the tear-resistant member, i.e., non woven 42, and of the collecting member 500 welding together through the pores of the filter, at the sealing plane. In this case, the materials for the tear-resistant member and collecting member are compatible in sealing (e.g., heat or ultra-sounds).

The beverage production device engages directly onto the inlet face of the capsule, i.e., the filter, by a liquid injection part 240 forming a large cover with a local injection duct 241. At the edge of the cover is provided a sealing edge 242 and a rubber seal member 243 to apply a sealing pressure on the upper edge of the capsule. The capsule 1D can further comprise a removable film (not shown) on top of the filter 40.

Figure 10:
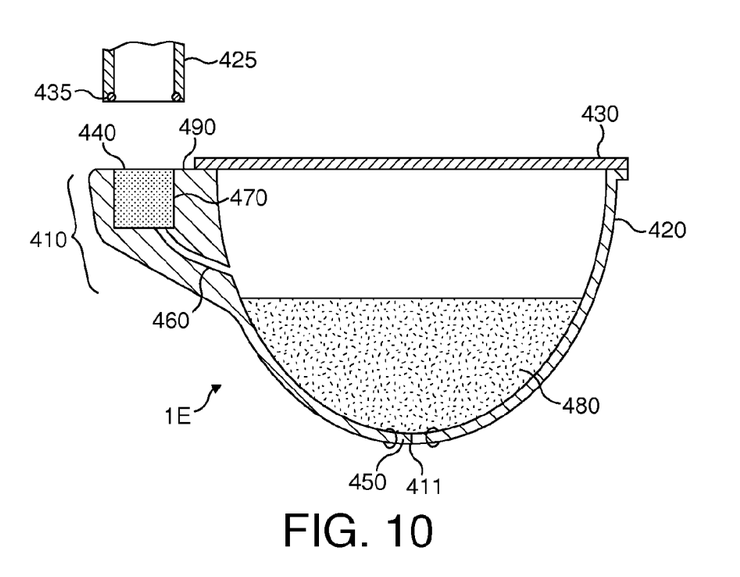
FIG. 10 is a schematic view of a capsule according to another embodiment in which the filter is a solid filtering piece inserted into the cup-shaped body of the capsule.

FIG. 10 illustrates another possible embodiment of the capsule 1E of the present invention. The capsule comprises a cup-shaped body 420 formed, for instance, by plastic injection moulding. The body 420 has a main chamber 480 containing the nutritional or food ingredients. The chamber may be closed by a lid 430 welded onto the upper edge of the body. The body further comprises, at one of its sidewall, a liquid injection portion 410 comprising a seat for receiving a solid filtering piece 440 and an injection conduit 460 fluidically connecting the seat 470 to the main chamber 480.

The seat 470 forms the collecting member for the filtering liquid which comprises a large surface which communicates with the narrower conduit 460. The portion 410 can be made integral to the body such as by injected plastic. The filtering piece 440 can be a ceramic or tube filter. The filtering piece can be overmoulded in the body or be inserted and connected in seat 470 by mechanical friction or welding.

The capsule 1E is fed with liquid by connecting the liquid injection portion 410 to liquid feed means 425 of the beverage production device (partially shown). For instance, the liquid feed means comprise a water injection duct abutting against the upper surface of the portion 490. Water-tightness can be maintained by sealing means 435 (e.g., rubber ring) interposed between the duct and the upper surface 490. The liquid injection portion could also form an upwardly protruding nozzle for providing a complementary shape-fitting engagement with the liquid feed means of the device. The engagement could also be formed directly about the filter with a filter portion protruding from the seat.

The liquid injection portion 410 is capable of injecting liquid at a high momentum in the capsule by conduit 460. The conduit 460 thus fluidically connects the filter seat to the ingredients compartment. The conduit is preferably of a diameter comprised between 0.4 and 3 mm. The conduit may comprise a restriction to provide a fluid acceleration downstream of the filter. For instance, the restriction can be placed in the merging area with the chamber 480 or slightly upstream of such area. The restriction can be a reduction of 10 to 80% of the largest diameter of the conduit. The conduit may taper progressively or on a step-by-step basis to form the restriction. The length of the conduit between seat 470 and the chamber 480 should preferably be kept as short as possible, preferably, between 2 to 10 mm. Of course, the conduit could divide into several sub-conduits for providing more than one high-momentum fluid inlet in the chamber. However, the number of inlets should be also maintained low. Preferably, the number of inlets should be lower than five.

The delivery system for the nutritional liquid in the capsule can be the same as the one described for the previous embodiments (i.e., a perforable membrane with perforable members) or a different system. As illustrated in FIG. 10, the beverage delivery system comprises a valve 450 which opens when a sufficient threshold of pressure of liquid has been reached in the chamber upstream of the valve. The valve can be a valve with a thin hole or a slit. It can be a rubber valve made of silicone and the like.

It can also be a breakable part such as a metal (e.g., aluminium) foil comprising a weakened line or a reduced thickness. The valve can be inserted through the outlet duct 411 or be bonded to the body of the capsule above or below the duct. The delivery system could also have additional paper or plastic filtering layers to ensure that no large solid particles or lumps can be delivered through the capsule before full dissolution and/or dispersion in the liquid.

Figure 11:
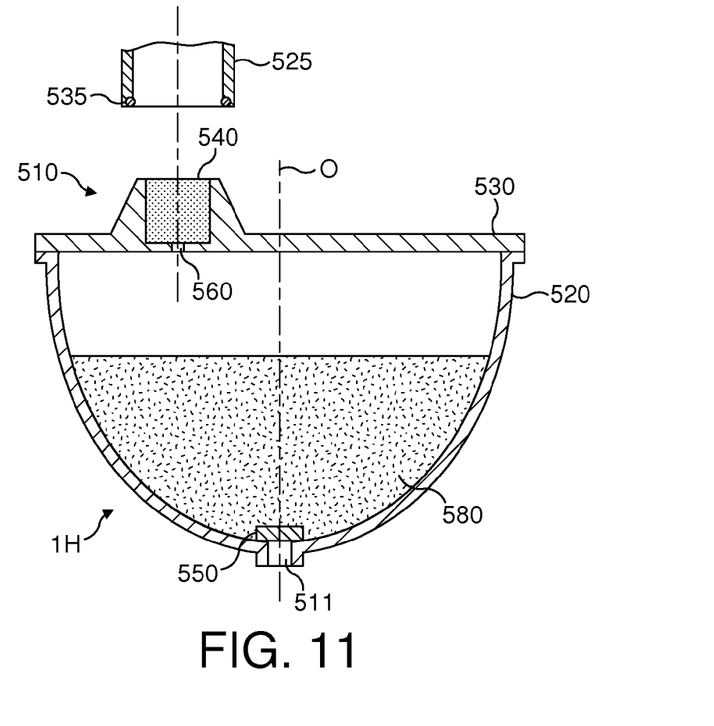
FIG. 11 is a schematic view of a capsule according to another embodiment in which the filter is a solid filtering piece inserted or embedded in the lid of the capsule.

FIG. 11 shows another possible embodiment of the capsule 1H of the invention. The capsule is similar to capsule 1E with the difference that the injection portion 510 is part of the lid 530 of the capsule. The capsule comprises a cup-shaped body 520 of injected or thermoformed plastic and/or aluminium forming an internal cavity 580 for the ingredients. The body is closed by lid 530 comprising the injection portion 510 in which is embedded a filter piece 540 such as made of sintered ceramic, metal or plastic (e.g., PP). The filter piece could also be constituted of a bundle of hollow fibres of defined porosity with each fibre having a controlled pore size. The hollow fibres can be maintained in a portion of tube and placed in the seal or the seat can serve to maintain the fibres in place. The portion 510 communicates with the chamber by a small-diameter hole or narrow slit 560. The hole or slit can be oriented in various possible directions upon needs in a direction parallel or non-parallel to the central axis O. The hole or slit is preferably of short length, for instance, between 1 and 8 mm. The delivery system may also comprise a valve 550 upstream or in the delivery duct 511 or it may be another delivery system as described previously. The duct 511 may comprise more than one outlet in order to separate the beverage flow into several flow streams.

Figure 12:
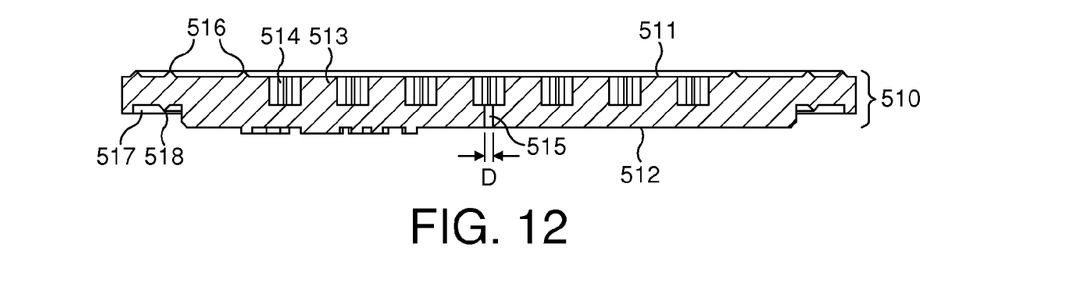
FIG. 12 is a preferred example of a cross sectional view of a flow collection member.

FIG. 12 illustrates, in cross section view, another possible example of a flow collection member 510. This member can be formed of a substantially rigid plastic element such as by injection moulding. The member comprises an upstream face 511 for supporting the filter and a downstream face 512 turned towards the ingredients' compartment. At its upstream face, several projections 513 are formed which are separated by channels 514. The projections are arranged to form channels which communicate together. One of these channels extends through the collecting member by an injection conduit 515 allowing collected liquid on the upstream face to traverse the member and be projected at a high momentum from the downstream face in direction of the compartment of the capsule. The conduit forms an orifice of diameter of about 0.6 mm and a length of about 2.0 mm. The conduit does not protrude from the downstream face 512 and is oriented substantially normal to the transversal plane of the collection member. The filter (not shown) is sealed on top of the upstream face such as by ultrasonic or heat welding. For this, the member comprises small energy directors 516, e.g., small concentric ribs, which are melted during sealing with the filter material. The collection member further comprises an indentation 517 arranged to fit onto the edge of the body of the capsule with an energy director 518 also for promoting ultrasonic sealing onto the edge.

Figure 13:
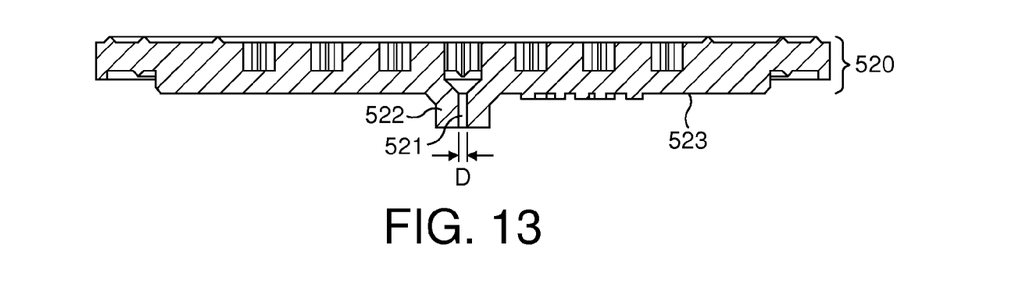
FIG. 13 is another example of the flow collection member of FIG. 12.

FIG. 13 illustrates another embodiment of the collection member 520 in which the only difference with member 510 lies in that the conduit 521 is formed in a nozzle 522 protrudes from the downstream surface 523.

In all the embodiments described before, it should be noticed that the capsule can be made of flexible films as opposed to rigid materials.

Further embodiments can be thought of, which can be obtained by a multitude of possible combinations of the features of the just described embodiments, as it would be apparent for a man skilled in the art.

What is claimed is:

1. A capsule for use in a beverage production device, the capsule comprising a compartment, a filter, and a flow collection member, with the compartment containing ingredients to produce a liquid nutritional or food component when a liquid is fed into the capsule at an inlet face thereof, the inlet face being provided, upstream of the compartment, with the filter provided downstream of the inlet face and upstream of the collection member, wherein the filter is an antimicrobial filter having a plurality of filtering orifices, and with the flow collection member placed downstream of the filter and upstream of the compartment to collect the filtered liquid from the filter; wherein the collection member comprises at least one restriction orifice to focus liquid flow of at least one jet of liquid at high velocity in the compartment containing the ingredients.

2. The capsule according to claim 1, wherein the flow collection member has considerably fewer orifices than the filter.

3. The capsule according to claim 1, wherein the at lease one restriction orifice has a longer transverse dimension or diameter that is between 0.4 and 1.5 mm.

4. The capsule according to claim 3, wherein the restriction orifice(s) has (have) a circular cross-section.

5. The capsule according to claim 3, wherein the restriction orifice comprises at least one an elongated slot.

6. The capsule according to claim 1, which further comprises a flow collecting chamber between the filter and the flow collection member, and support members placed downstream of the filter to at least reduce flexure deformation under the pressure of liquid exerted upstream of the filter.

7. The capsule according to claim 6, wherein the support members are integrally formed as projections protruding from the flow collection member.

8. The capsule according to claim 1, wherein the filter comprises a polymeric microporous membrane.

9. The capsule according to claim 8, wherein the membrane is made of polyethersulphone, cellulose acetate, cellulose nitrate, polyamide and combinations thereof.

10. The capsule according to claim 1, wherein the filter is a three-dimensional filter made of ceramic, sintered metal or plastic or hollow fibres.

11. The capsule according to claim 8, wherein the filter comprises a tear-resistant permeable member placed upstream of the microporous membrane.

12. The capsule according to claim 11, wherein the tear-resistant permeable member is a rigid plastic cover, a non woven material or a combination thereof.

13. The capsule according to claim 11, wherein the tear-resistant permeable member is a non woven material formed of a mono-layer or multi-layer formed of one or more polyolefins.

14. The capsule according to claim 13, wherein the polyolefins include polypropylene, polyethylene, polypropylene/polyethylene/polypropylene, or other combinations of polypropylene and polyethylene.

15. The capsule according to claim 13, wherein the tear-resistant permeable member is sealed onto the surface of the microporous membrane.

16. The capsule according to claim 1, wherein the compartment is further demarcated by a cup-like shaped body with a bottom delivery system.

17. The capsule according to claim 16, wherein the bottom delivery system includes one of:
 a perforable membrane against perforating members;
 a membrane that breaks under pressure;
 a valve comprising at least one hole or slit opening under pressure; or
 a filtering wall with premade orifices for separating the delivered liquid from ingredient solids remaining in the compartment.

18. A beverage production system comprising a capsule according to claim 1 and a beverage production device wherein the device comprises an injection nozzle complementary fitting on the inlet face of the capsule in a liquid-tight manner to allow injection of a liquid through the filter placed upstream of the compartment.

19. A method of producing a liquid nutritional or food component from the capsule of claim 1, which comprises injecting a liquid through the filter and into the compartment wherein the filtered liquid mixes with the ingredients to produce the liquid nutritional or food component.

* * * * *

UNITED STATES PATENT AND TRADEMARK OFFICE
CERTIFICATE OF CORRECTION

PATENT NO.         : 8,563,058 B2                                    Page 1 of 1
APPLICATION NO.    : 13/258956
DATED              : October 22, 2013
INVENTOR(S)        : Roulin et al.

It is certified that error appears in the above-identified patent and that said Letters Patent is hereby corrected as shown below:

In the Claims
Column 13:
Line 1 (claim 3, line 1), change "lease" to -- least --.

Signed and Sealed this
Tenth Day of December, 2013

Margaret A. Focarino
*Commissioner for Patents of the United States Patent and Trademark Office*